(12) United States Patent
Sullivan

(10) Patent No.: US 7,725,083 B1
(45) Date of Patent: May 25, 2010

(54) ANTENNA SYSTEM FOR A WIRELESS COMMUNICATION DEVICE

(75) Inventor: Jonathan Lee Sullivan, Lincoln, NE (US)

(73) Assignee: Centurion Wireless Technologies, Inc., Lincoln, NE (US)

( * ) Notice: Subject to any disclaimer, the term of this patent is extended or adjusted under 35 U.S.C. 154(b) by 0 days.

(21) Appl. No.: 09/477,954

(22) Filed: Jan. 5, 2000

(51) Int. Cl.
*H04B 1/034* (2006.01)

(52) U.S. Cl. .......................... 455/95; 455/97; 455/90.1; 455/90.2; 455/90.3; 455/347; 343/702; 343/900; 343/903

(58) Field of Classification Search ................ 455/90.3, 455/550.1, 575.1, 575.7, 97, 128, 129, 269, 455/272, 277.1, 347, 351, 95, 90.1, 90.2; 343/702, 720, 725, 872, 873, 878, 880, 888, 343/889, 893, 900, 903; 379/433.01, 433.11
See application file for complete search history.

(56) References Cited

U.S. PATENT DOCUMENTS

| | | | | |
|---|---|---|---|---|
| 4,661,992 A | * | 4/1987 | Garay et al. | 455/89 |
| 4,862,182 A | * | 8/1989 | Egashira | 343/702 |
| 4,958,382 A | * | 9/1990 | Imanishi | 455/277.1 |
| 5,109,539 A | * | 4/1992 | Inubushi et al. | 455/575.1 |
| 5,245,350 A | * | 9/1993 | Sroka | 343/702 |
| 5,663,692 A | * | 9/1997 | Swope | 333/101 |
| 5,801,661 A | * | 9/1998 | Suzuki | 343/702 |
| 6,064,863 A | * | 5/2000 | Matai | 455/90 |
| 6,140,970 A | * | 10/2000 | Ylijuva | 343/702 |
| 6,171,123 B1 | * | 1/2001 | Chang | 439/188 |
| 6,225,951 B1 | | 5/2001 | Holshouser et al. | 343/702 |
| 6,469,669 B1 | * | 10/2002 | Tran | 343/702 |

\* cited by examiner

*Primary Examiner*—Vincent P Harper
*Assistant Examiner*—Khai M Nguyen
(74) *Attorney, Agent, or Firm*—Harness, Dickey & Pierce, P.L.C.

(57) ABSTRACT

A wireless communication device such as a cellular telephone handset is disclosed including a housing having a transceiver circuit disposed therein. An internal antenna is also disposed within the housing which is RF connected to the transceiver circuit. An external, retractable antenna is mounted on the housing and is selectively movable between a retracted position and an extended position. The external, retractable antenna is RF connected to the transceiver circuit. When the external antenna is retracted, the internal antenna functions as a primary antenna. Should the need arise, the external antenna may be extended to improve the quality of the radio signals.

3 Claims, 3 Drawing Sheets

ANTENNA SYSTEM FOR A WIRELESS COMMUNICATION DEVICE

BACKGROUND OF THE INVENTION

1. Field of the Invention

This invention relates to an antenna system for a wireless communication device and more particularly to a combination internal/external antenna for a wireless communication device such as a cellular telephone.

2. Description of the Related Art

Internal antennas have been previously used in the interior of a wireless communication device housing or as an internal part of the housing itself. Internal antennas for portable wireless communication devices are becoming very popular in wireless design. Manufacturers are being encouraged to develop and install internal antennas in wireless devices inasmuch as internal antennas are becoming appealing to the user. First, the aesthetics of the handset is perhaps the biggest reason that internal antennas are gaining popularity. Much effort is put into the styling of cellular handsets and an antenna mounted on the outside of the housing detracts from the aesthetic appearance of the device. Second, robustness of the handset is improved by placing the antenna inside the protective housing instead of having the antenna exposed on the outside of the handset and extending therefrom. Third, due to the smaller overall size of the handset when an internal antenna is utilized, the handset is more convenient to stow away into pockets or purses when not in use. Fourth, in some instances, internal antennas may shield a portion of the radiated energy away from the user's head, which is important because more radiated energy is being transmitted as useful radio signals and less radiated energy is being absorbed by the user's body. One of the disadvantages of internal antennas is that in some cases they do not work well enough to receive or transmit a high quality radio signal as well as an external antenna.

SUMMARY OF THE INVENTION

A wireless communication device is disclosed comprising a housing having a transceiver circuit disposed within the housing. An internal antenna is disposed within the housing which is RF connected to the transceiver circuit. An external, retractable antenna is mounted on the housing and is selectively movable from a retracted position within the housing to an extended position. The external, retractable antenna is RF connected to the transceiver circuit. In most cases, a switching mechanism will be utilized in the device which operatively connects the internal and external antennas to the transceiver circuit so that the internal antenna is normally in circuit and wherein said external antenna is normally out of circuit when in its retracted position. The matching circuit switches the internal antenna out of circuit and switches the external antenna in circuit when the external antenna is in its extended position. Preferably, a remote, RF port is provided which is mechanically connected to the internal antenna.

It is a principal object of the invention to provide an antenna system designed primarily for cellular telephones, but which also can be utilized on other portable wireless devices.

It is a further object of the invention to provide an antenna system for a wireless communication device which comprises a primary internal antenna and a secondary retractable external antenna.

Still another object of the invention is to provide a dual antenna system for a wireless communication device with the dual antennas comprising an internal antenna and an external antenna.

Still another object of the invention is to provide a dual antenna system for a wireless communication device wherein if call reception becomes degraded while using the internal antenna, the user has the ability to extend the secondary antenna by pulling it to the extended position so that the RF performance of the device is improved.

It is a further object of the invention to provide a dual antenna system for a wireless communication device which does not detract from the aesthetic appearance of the handset.

Still another object of the invention is to provide a dual antenna system for a wireless communication device which enables the device to have good performance, but which does not occupy a large amount of space.

These and other objects will be apparent to those skilled in the art.

DESCRIPTION OF THE PREFERRED EMBODIMENT

Figure 3:
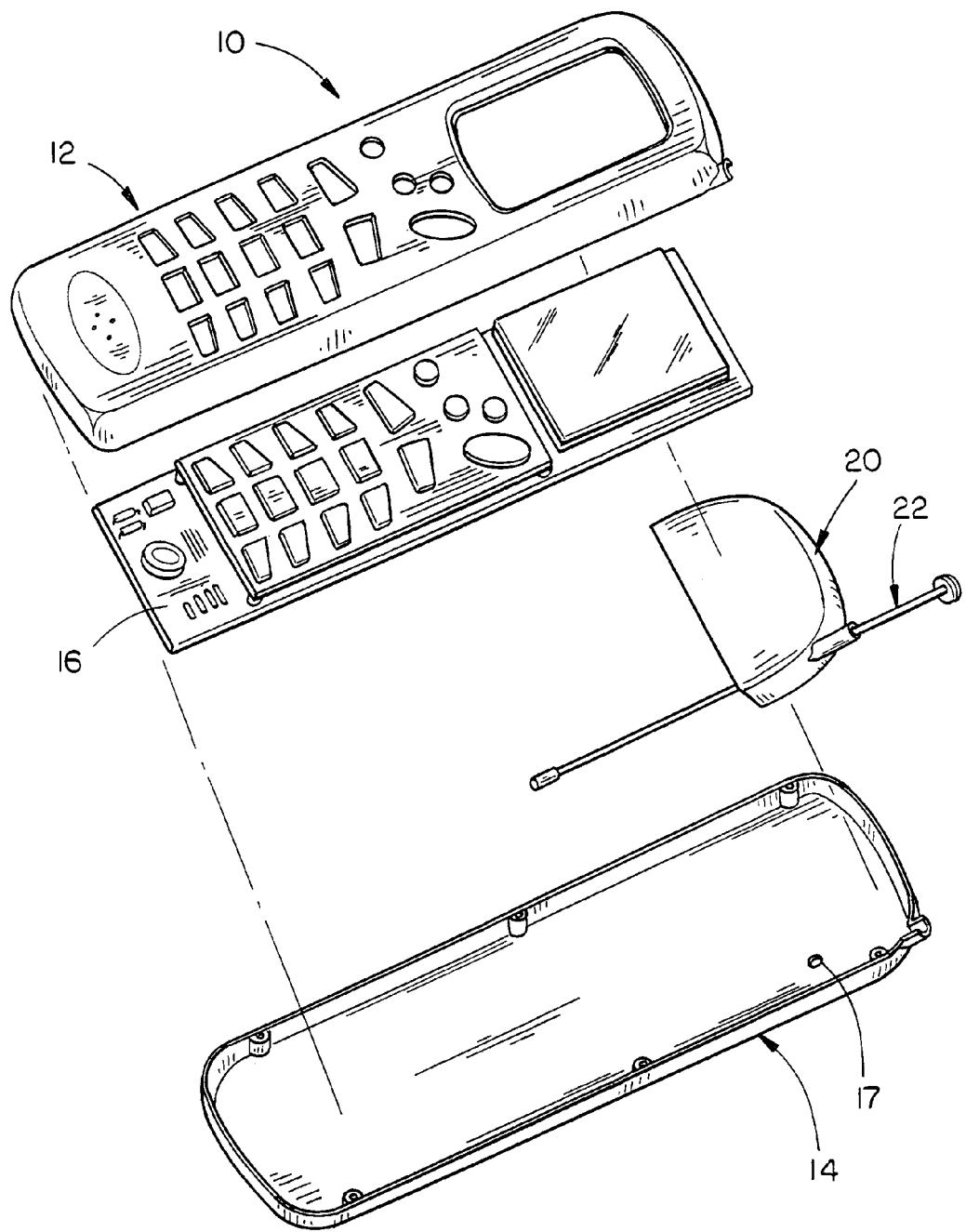
FIG. 3 is an exploded perspective view of the handset having the combination internal/external antenna incorporated therein.
Figure 4:
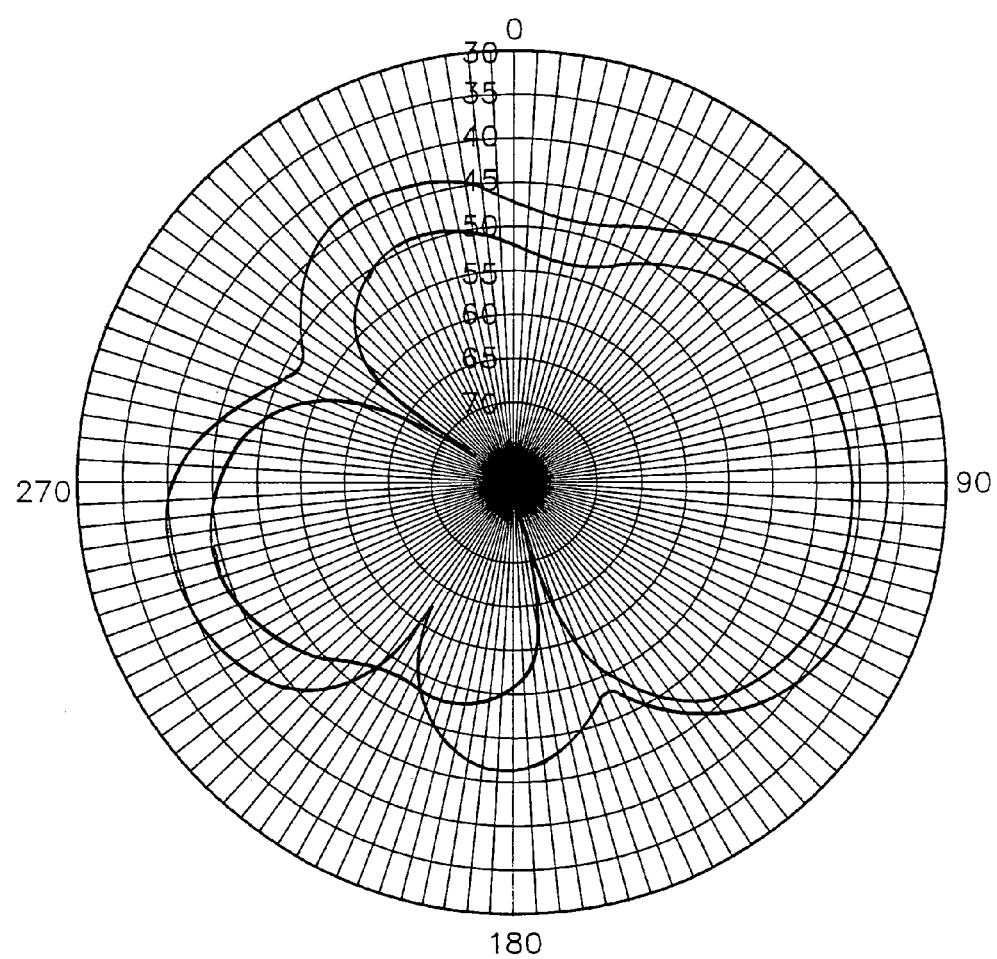

The numeral 10 refers to a conventional wireless communication device such as a cellular telephone handset. Handset 10 includes a conventional front housing 12, back housing 14 and a printed circuit board 16 which functions as the transceiver circuit. Back housing 14 is preferably provided with an opening 17 which communicates with a remote RF port 18 which is mechanically connected to the internal antenna 20 (FIG. 3). The remote RF port 18 may be fabricated as a separate component and attached to the internal antenna 20 or may be insert-molded into the internal antenna. Further, RF port 18 may be incorporated as one piece into the internal antenna 20.

Internal antenna 20 is provided or mounted in the interior of the handset 10 and may be constructed using conventional methods and the methods of the prior art. Two common methods of fabricating these types are antennas are to first mold the antennas from a plastic material and then selectively plate metal thereon. The internal antenna 20 is the primary antenna of this invention and may be designed as a PIFA, meander line, micro-strip patch or any other antenna design that will meet the electrical and mechanical requirements of the system.

Figure 1:
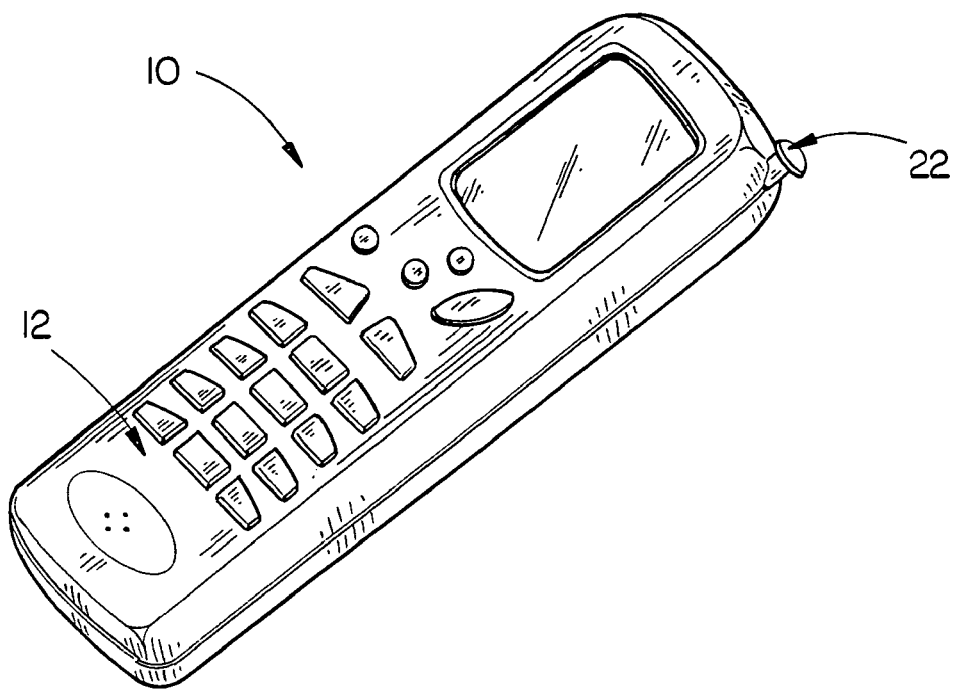
FIG. 1 is a perspective view of a cellular telephone handset.
Figure 2:
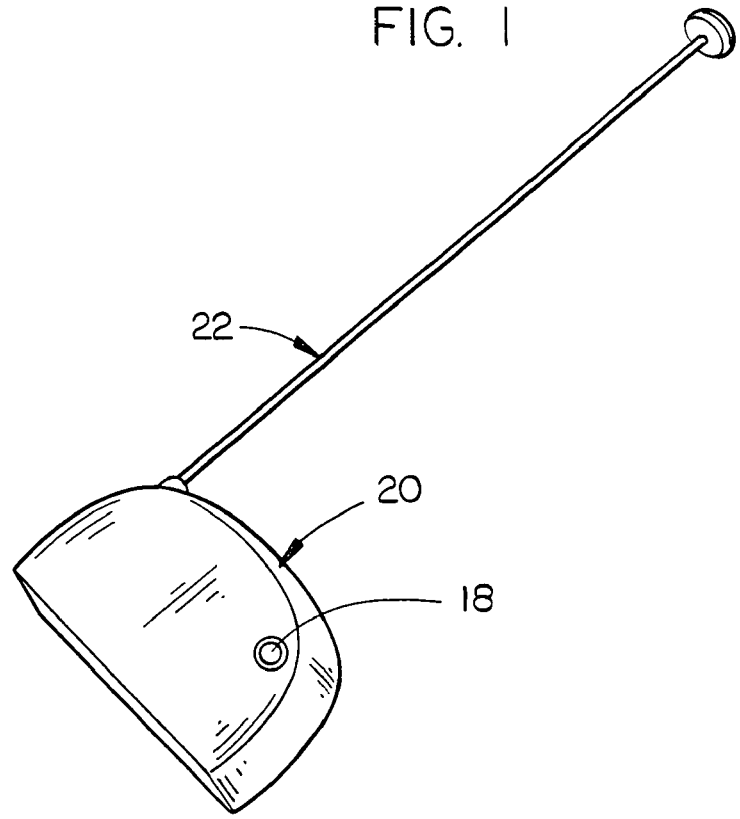
FIG. 2 is a back perspective view of a combination internal and external antenna for use with a cellular telephone handset of FIG. 1.

The numeral 22 refers to a conventional retractable antenna which is selectively movable between the retracted and extended positions in conventional fashion. When the antenna 22 is in its retracted position of FIG. 1, only the upper end of the antenna is exposed so as not to detract from the aesthetics of the handset. The external antenna 22 is commonly referred to as a whip antenna and may be constructed using various existing electromechanical designs such as top loaded, bottom loaded, etc.

In some cases, an antenna switching device will be utilized to electrically connect one antenna to the transceiver circuit while disconnecting the second antenna from the transceiver circuit. For example, when the external retractable antenna 22 is extended, the antenna feed circuit is connected (FIG. 3). When the external retractable antenna 22 is retracted, it is disconnected from the antenna feed circuitry and the internal antenna 20 is connected. The internal antenna 20 functions as the primary antenna while the retractable antenna 22 functions as a secondary antenna. The antenna system may operate in a single frequency or it may be made to operate in several frequency bands at once.

The internal antenna 20 will normally work well enough to receive and send a radio signal most of the time. When the radio signal fades and becomes weak, the secondary antenna 22 may be extended. The "back-up" secondary antenna 22 may be extended when needed and retracted into the handset when not in use.

Thus it can be seen that a novel antenna system has been provided for a wireless communication device which utilizes a primary internal antenna, but which may use a secondary retractable antenna should the need arise.

Thus it can be seen that the invention accomplishes at least all of its stated objectives.

I claim:

1. A wireless communication device, comprising:
   a housing including a front housing member and a back housing member;
   said front and back housing members having upper and lower ends;
   a printed circuit board positioned in said housing adjacent said front housing member which functions as a transceiver circuit;
   an internal antenna positioned in said housing adjacent said upper end of said back housing member; and
   an external, retractable antenna movably mounted on said internal antenna and being movable between a retracted position and an extended positioned with respect thereto;
   said internal antenna being in circuit with said transceiver circuit when said external antenna is in its said retracted position;
   said internal antenna being out of circuit with said transceiver circuit when said external antenna is in its said extended position;
   said external antenna being in circuit with said transceiver circuit when in its said extended position; and
   said external antenna being out of circuit with said transceiver circuit when in its said retracted position;
   wherein said internal antenna has a front and back sides and wherein said back side of said internal antenna has a remote RF port formed in its back side; said back housing member having an opening formed therein which communicates with said remote RF port.

2. The wireless communication device of claim 1 wherein a switching mechanism selectively connects either said external antenna or said internal antenna to said transceiver circuit.

3. The wireless communication device of claim 1 wherein said internal and external antennas are electrically disconnected from one another at all times.

* * * * *